United States Patent [19]

Hellmer

[11] 4,080,146
[45] Mar. 21, 1978

[54] SEGMENTED BLOW MOLDS

[75] Inventor: Ernest W. Hellmer, Chicago, Ill.

[73] Assignee: The Continental Group, Inc., New York, N.Y.

[21] Appl. No.: 526,267

[22] Filed: Nov. 22, 1974

[51] Int. Cl.[2] .............................................. B29C 17/07
[52] U.S. Cl. .................................. 425/536; 425/537; 425/540
[58] Field of Search ............. 425/326 B, 387 B, 450.1, 425/451.4, 342, 451.9, DIG. 205, DIG. 206, DIG. 212, DIG. 211, DIG. 216, 536–537, 540

[56] References Cited

U.S. PATENT DOCUMENTS

| | | | |
|---|---|---|---|
| 3,621,525 | 11/1971 | Butcher | 425/326 B |
| 3,753,641 | 8/1973 | Turner et al. | 425/326 B |
| 3,797,985 | 3/1974 | Garver | 425/387 B |
| 3,804,573 | 4/1974 | Del Piero | 425/DIG. 211 |
| 3,869,237 | 3/1975 | Hellmer et al. | 425/326 B |

Primary Examiner—Francis S. Husar
Assistant Examiner—John McQuade

Attorney, Agent, or Firm—Diller, Brown, Ramik & Wight

[57] ABSTRACT

This disclosure relates to a mold construction particularly adapted for the blow molding of hollow articles having configurated bottoms. The mold is split longitudinally of the article and includes first and second halves each having a separate end portion. The end portions are interconnected so that when the mold is open, both end portions are retained with one mold half with one end portion moving relative to its respective mold half both longitudinally and transversely for both moving transversely with a molded article and longitudinally away from the molded article so as to first completely release the molded article from one mold half, and the end portion of the other mold half being thereafter movable longitudinally with respect thereto to separate the other end portion from the molded article and thus permit the ejection of the molded article from the mold. The molds are arranged in end-to-end substantially touching relation wherein there is a minimum of waste material between adjacent molded articles.

19 Claims, 6 Drawing Figures

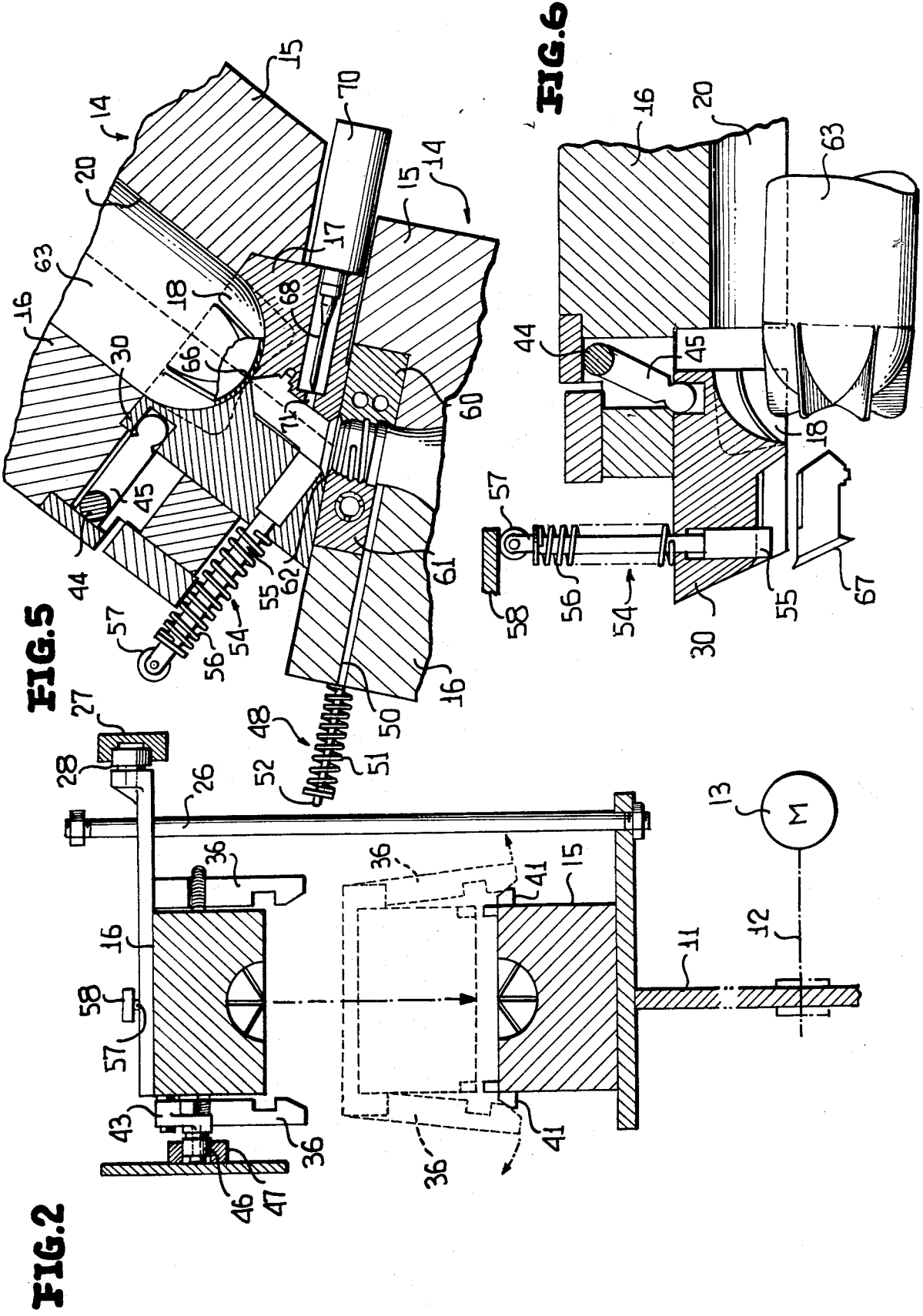

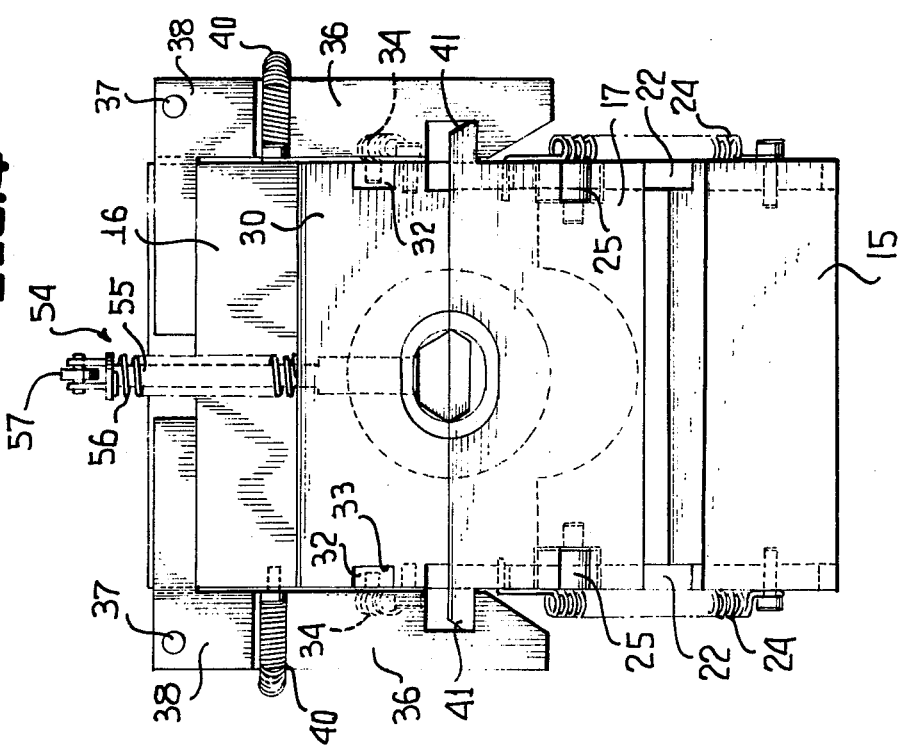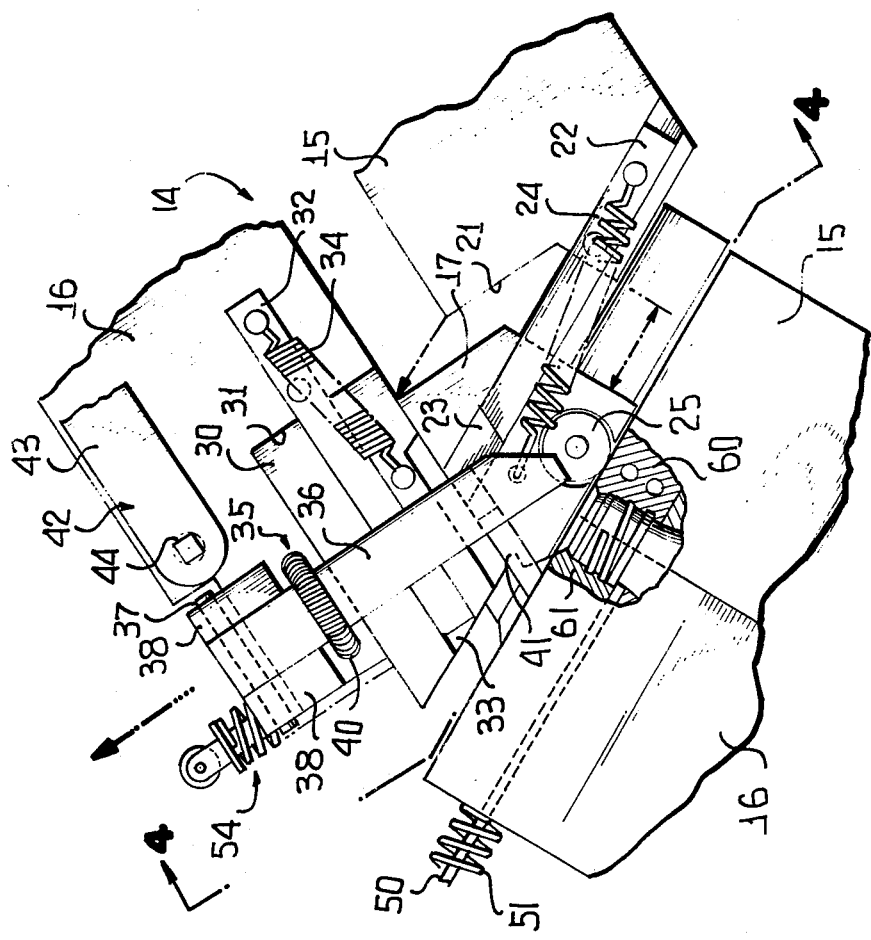

SEGMENTED BLOW MOLDS

This invention relates in general to new and useful improvements in blow molding machines, and more particularly to a blow molding machine for molding bottles and like hollow articles having configurated bottoms.

When a blow molded article is provided with a configurated bottom having a plurality of radial projections, ejection of the blow molded article from a conventional mold without damage thereto is physically impossible. As a result, molds for molding such articles must be other than a simple two piece split construction. Certain of such molds include a plurality of radially separable parts while others of the molds include additionally longitudinally separable parts. However, in the past such mold constructions have proven to be inefficient.

Also, when the article to be formed is blow molded from a continuously extruded tube type parison, that portion of the tube disposed between cavities of adjacent molds is waste material which must be reprocessed. Accordingly, in the past there have been developed numerous types of linkage which would permit the molds to be closely adjacent to one another at the time they are closed about the extruded tube. This has required complex linkage.

In accordance with this invention it is proposed to solve the above-outlined problems by means of a simple mold construction which will assure the opening of a mold in a manner wherein a plastic article blown therein may be removed without damage. At the same time, the mold construction provides the molds to be immediately adjacent one another without the requirement of any special linkage which effects radial or circumferential movement of the molds.

Another feature of the invention is that all of the scrap is blown and therefore cooled. This prevents further heat degradation of the material making it reusable. It also speeds up cycle time by speeding up the cooling of the hottest part of mold.

Another feature of the invention is that the article is partially finished in the mold with blown scrap being broken off during the opening of the mold and being ejected separately from the article.

Yet another feature of the invention is that retraction of the end portions of the mold occur during mold opening and not during closed mold cycle with the result that a longer blowing cycle is permitted permitting a faster operation and a larger number of containers per minute per given machine.

Finally, the mold arrangement is such that there are fewer parts and there is easier accessibility to the end portions of the mold.

Basically, the molding machine includes a support mounted for rotation about a fixed axis and each mold includes a first mold half which is fixedly mounted on the support for rotation therewith and a second mold half carried by the support for rotation therewith and for radial movement with respect to both the support and the fixed mold half. Each of the two mold halves include separate end portions for defining the base of a molded article. The end portion of the first mold half is mounted for both radial or transverse and longitudinal movement and is movable together with the second mold half during the opening operation thereof so as to move together with the molded article during the opening of the mold and to move longitudinally with respect to the molded article so as to be separated therefrom. The end portion of the second mold half is mounted for movement longitudinally with respect thereto after the termination of the movement of the first mold half end portion so as to completely release the bottom portion of the molded article and permit the ejection thereof from the second mold half.

The flash or waste material between adjacent mold cavities is primarily confined within the end portions of the mold halves and during the opening movement of the mold is carried by the end portion of the second mold half and is separated from the molded container during the movement of the end portion of the second mold half relative thereto.

With the above and other objects in view that will hereinafter appear, the nature of the invention will be more clearly understood by reference to the following detailed description, the appended claims and the several views illustrated in the accompanying drawings:

IN THE DRAWINGS

FIG. 2 is a fragmentary vertical sectional view taken along the line 2—2 of FIG. 1 and shows schematically the mounting of the mold halves of a mold.

FIG. 3 is an enlarged fragmentary elevational view, with parts broken away and shown in section and shows one of the molds during an initial portion of the opening thereof.

FIG. 4 is an end view of the partially opened mold taken generally along the line 4—4 of FIG. 3.

FIG. 5 is an enlarged fragmentary longitudinal sectional view taken through two adjacent closed molds.

FIG. 6 is an enlarged fragmentary longitudinal sectional view taken through an outer mold half at the time the molded article is being discharged therefrom.

Figure 1:
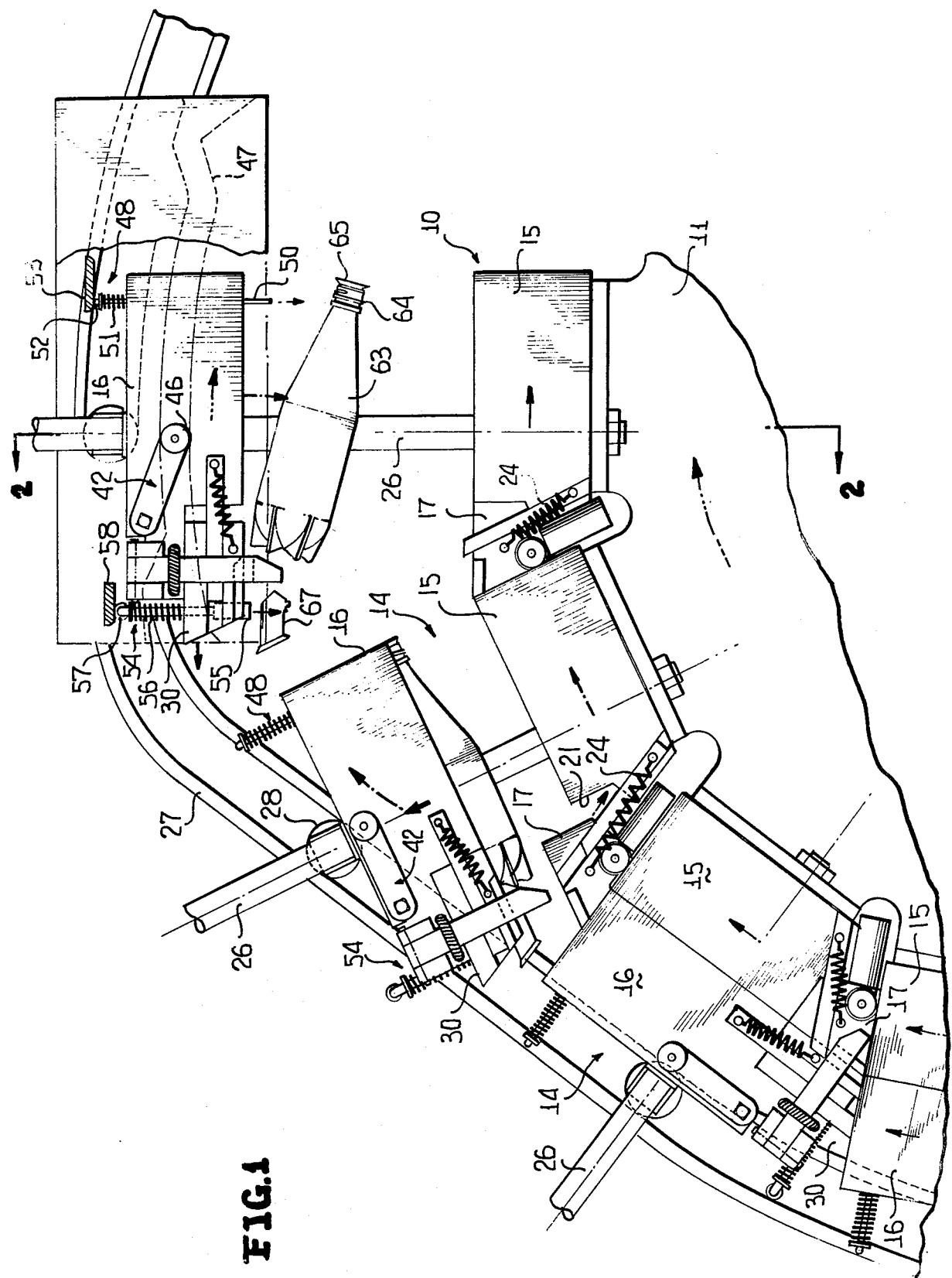
FIG. 1 is a schematic fragmentary elevational view of a molding machine in accordance with this invention incorporating the novel molds thereof.

Referring now to the drawings in detail, it will be seen that there is illustrated a molding machine formed in accordance with this invention, the molding machine being generally identified by the numeral 10. As is best illustrated in FIG. 2, the molding machine 10 includes a support 11 which is mounted for rotation about a fixed axis 12 and is driven by a suitable motor 13. Mounted on the support 11 for rotation therewith is a plurality of identical molds, each mold being generally identified by the numeral 14.

It is to be understood that the molding machine also includes a plastics material extruder (not shown) for the purpose of extruding a continuous plastic tube parison. With reference to FIG. 1, it is to be understood that the plastic tube would be extruded vertically downwardly at the right side of the machine, at which time halves of the molds 14 would be opened to receive the tube therein and immediately thereafter the mold halves would close to clamp the tube continuously therewithin.

Each mold 14 includes an inner or first mold half 15 and a second or outer mold half 16. The mold half 15 is mounted on the support 11 in a substantially fixed relationship. It is to be understood that while the mold halves 15 have been illustrated as being fixedly secured in place on the support 11, the mold halves 15 may have incorporated therein spring packs which would allow a positive mechanical clamping together of the mold halves 15 and 16 without jamming of the clamping mechanism. However, for purpose of simplicity, no attempt has been made to illustrate the spring packs which would allow a slight radially inward movement of the mold half 15 at the time the mold 14 is closed.

The mold half 15 has associated therewith an end portion or base 17 which is a separate component and which is configured to define one half of a base or bottom portion 18 of a cavity 20 defined by the mold 14. In the closed position of the mold 14, the end portion 17 is fixedly seated relative to the mold half 15.

Referring now to FIG. 3 in particular, it will be seen that the end portion 17 is movable away from a seat 21 formed in an adjacent part of the mold half 15 in both a radial and longitudinal direction. Movement of the end portion 17 relative to the mold half 15 is a guided movement and is restricted by means of a pair of guide bars 22 fixedly secured to opposite sides of the mold half 15 and having radial outer end portions thereof seated in grooves 23 formed in opposite sides of the end portion 17.

It is to be particularly noted that a tension spring 24 extends between the mold half 15 and the end portion 17 with the tension spring acting on the end portion 17 to automatically urge the same towards a seated position on the seat 21. It is to be understood that there may be a tension spring 24 on each side of the mold 14.

It is to be noted from FIG. 3 that the molds 14 are disposed in end-to-end relation and in substantially touching relation. If desired, during the opening and closing movement of the end portion 17, the end portion 17 may be guided by the extreme end of the next adjacent mold half 15. To this end, a suitable anti-friction device or devices 25 may be carried by the end portion 17 for contacting the end of the mold half 15. In the illustrated form of the invention, the anti-friction device is in the form of a roller.

For the purpose of simplicity of illustration, each mold 14 the support 11 is illustrated as having a pair of radially extending rods 26 on which the mold half 16 support is mounted for radial movement between open and closed positions. At this time, it is also pointed out that the molding machine 10 includes a cam track 27 in which there is engaged a cam follower 28 carried by the mold half 16 wherein the mold half 16 is automatically moved radially in response to the rotation thereof so that opening and closing movement of the mold half 16 is automatically effected. The contour of the cam track 27 is schematically illustrated in FIG. 1.

Referring once again to FIG. 3, it will be seen that the outer or second mold half 16 is provided with a separate end portion 30 which is mounted for longitudinal movement with respect thereto. The end portion 30 normally seats against a seating surface 31 on the mold half 16. The end portion 30 cooperates with the end portion 17 to define the bottom portion 18 of the mold cavity 20.

In order that movement of the end portion 30 relative to the mold half 16 may be limited to longitudinal movement, there is mounted on opposite sides of the mold half 16 longitudinally extending guide bars 32 which are received in complementary grooves 33 formed in opposite sides of the end portion 30. At this time it is also pointed out that there is provided a tension spring 34 on at least one side of the mold for returning the end portion 30 to its position seated against the seat 31 and normally retaining the same in that position. The tension spring 34 extends between the mold half 16 and the end portion 30.

Latch means, generally identified by the numeral 35, interconnect the end portions 17 and 30 for movement together radially outwardly during the opening of the mold 14, as is shown in FIG. 3. The latch means 35 includes a latch member 36 disposed on each side of the mold 14 and pivotally mounted on a longitudinal pivot pin 37 carried by the outer mold half 16. It is to be noted that the pivot pin extends between a pair of mounting ears 38 which are spaced apart to define a guide for the latch member 36. It is also to be noted that associated with each latch member 36 is a tension spring 40 which urges the latch member to its operative position.

As is clearly shown in FIGS. 3 and 4, at each side of the end portion 17 there is a projecting ledge 41 behind which the respective latch member 36 engages so as to permit the latch members 36 to clamp the end portion 17 against the end portion 30. However, the ledges 41 are longitudinally slidable relative to the respective latch members 36 to effect the automatic releasing of the end portion 17 from the latch member 36 at a predetermined point in the opening of the mold 14.

Opening, and if desired closing, of the end portion 30 relative to the mold half 16 is effected by means of a crank mechanism, generally identified by the numeral 42. The crank mechanism 42 includes a crank arm 43 which is connected to a shaft 44 rotatably mounted within the mold half 16. The shaft 44, as is best shown in FIG. 5, carries a pair of lever members 45 which are engaged with the end portion 30 so that when the shaft 44 is rotated in a clockwise direction, the end portion 30 will be extended longitudinally with respect to the mold half 16.

Actuation of the crank mechanism 42 is automatic. To this end, as is shown in FIGS. 1 and 2, the end of the lever 43 remote from the shaft 44 is provided with a cam follower 46 which is received in a cam track 47. The cam track 47 is so related with respect to the cam track 27 so that at a predetermined point during the opening movement of a mold 14, the crank mechanism 42 is actuated so as to shift the end portion 30 longitudinally away from the outer mold half 16.

Referring now specifically to FIG. 1, it will be seen that the outer mold half 16 is provided with a knock-out mechanism 48 which includes a knock-out rod 50 resiliently urged to a retracted position by a spring 51 and having a follower 52 which is engageable with a fixed cam 53.

The end portion 30 is also provided with a knock-out mechanism 54 which includes a knock-out rod 55 engageable with molded flash material for removing the same from the end portion 30. The knock-out rod 55 is urged to a normally retracted position by a spring 56 and has a follower 57 which engages a fixed cam 58 for effecting the actuation of the knock-out mechanism 54.

OPERATION

It is to be understood that the molds 14 close about a continuously extruded tube of plastics material in a conventional manner and at the leading end of each mold 14, neck ring inserts 60, 61, in cooperation with the end portions 17, 30 of an adjacent leading mold 14 engage, as at 62, the tube so as to weaken the wall thereof to facilitate rupturing of the tube. When the molded article is a bottle, such as the bottle 63 of FIG. 1, it will be seen that the clamping of the tube occurs immediately adjacent the neck finish 64 so as to leave only a minimal amount of flash or scrap material 65 to be removed from the neck finish of the bottle.

Referring once again to FIG. 5, it will be seen that the end portions 17,30 are also so configured so as to pinch off the tube in sealed relation as at 66. The net result is that there is only a small amount of scrap tube or flash 67 (FIG. 1) between adjacent molded articles.

Referring once again to FIG. 5, it will be seen that the end portion or base 17 carries a conventional blow needle 68. The blow needle 68 is supported by a conventional blow needle support mechanism 70 which is operable to project the blow needle 68 through an opening 71 in the end portion 17 into the cavity portion 18 to penetrate a portion of a tube trapped therein. It will be apparent from the illustration of FIG. 5 that the blow needle of a preceding mold blows the article of a following mold. It will also be apparent that the scrap or flash 67 disposed between adjacent blown articles remains hollow and is thus cooled not only by its contact with the metal of the mold, but also by the air being blown therethrough.

After the article 63 has been blown within a mold 14, as the mold approaches the upper part of its travel, the cam track 27 is operative, in conjunction with the cam follower 28, to open the mold 14. The opening operation is effected by the movement of the mold half 16 radially outwardly away from the mold half 15 with the outward movement of the mold half 16 being guided by the guide rods 26 on which it is mounted.

With particular reference to FIG. 3, it will be seen that as the mold half 16 moves radially outwardly with respect to the respective mold half 15, the latch means 35 will effect movement of the associated end portion or base 17 outwardly away from the mold half 15. However, the movement of the end portion 17 is not radial movement, but due to the position of the guides 22 the movement is a combination of radial and longitudinal movement.

It will be readily apparent that the end portion 17 of the inner mold half 15, by moving away from the mold half 15 together with the mold half 16 aids in the separation of the blown article 63 from the mold half 16 and the carrying thereof with the mold half 16. It will also be apparent that as the end portion 17 moves longitudinally with respect to the mold halves 15 and 16, it will separate from the configured bottom of the molded article so that the molded article will be retained solely by the outer mold half 16 and its associated end portion 30. Further, it will be apparent that the interlock between the molded article and the end portion 30 will be such that the molded article will be retained within the mold half 16 as it continues its movement away from the mold half 15.

Referring now to FIG. 3 in particular, it will be seen that the end portion 17, as it moves outwardly with the mold half 16, due to the longitudinal component of its movement, gradually moves the ledges 41 thereof out of alignment with the latch members 36. As soon as the ledges 41 are disengaged from the latch members 36, the springs 24 will snap the end portion 17 back against its seat 21 so that even before the mold half 16 reaches its fully opened position, the mold half 15 is ready to receive another length of tubing.

After the end portion 17 has been released by the latch assembly 35, the crank mechanism 42 is actuated to move the end portion 30 longitudinally with respect to the mold half 16, thereby separating the scrap 67 from the molded article 63 and releasing the bottom of the molded article so that the same may be ejected from the mold half 16. After movement of the end portion 30 to release the molded article has occurred, the scrap 67 and the blown article 63 are ejected. While the ejection has been shown as being a substantially simultaneous one, it is to be understood that the scrap 67 and the molded article 63 may be ejected at different times to go down different chutes (not shown) instead of a common chute.

After the blown article has been discharged from the outer mold half 16, the crank mechanism 42 is again actuated so as to return the end portion 30 to its normal seated position with respect to the mold half 16. Thus, the outer mold half is now ready to cooperate with the inner mold half to receive another length of tubing and to effect the molding of another article.

It will be readily apparent from the foregoing that in addition to providing for the separation of an article having a configured bottom from the mold, the mold construction provides for a very short length of scrap 67, the length of the scrap 67 being about 50% of that which normally occurs in molding machines of the type disclosed here. In addition, inasmuch as the scrap 67 is blown, it cools faster and is ready to be discharged from the mold.

The particular relationship of the scrap with respect to the molded article is one wherein the scrap is cleanly removed from the article and the scrap 65 remaining with the article is a minimum so that it may be said that the article 63 is partially finished within the mold 14.

It will also be apparent that inasmuch as the end portions 17 and 30 retract during the mold opening movement, no time is lost for the retraction of the end portions. Thus, a longer portion of the travel of the mold 30 may be devoted to the blowing cycle with the result that the machine may run at a faster rate and produce more containers. Also, it will be apparent from the foregoing that fewer parts are involved in the mold construction and that there is ready accessibility to the base or end portions 17 and 30.

Although only a preferred embodiment of the invention has been specifically illustrated and described herein, it is to be understood that minor variations may be made in the mold construction without departing from the spirit and scope of the invention, as defined by the appended claims.

I claim:

1. A mold for blow molding hollow articles having configured bottoms, said mold comprising first and second mold halves having a parting plane extending longitudinally of an article cavity defined therein, means mounting said mold halves for transverse separation, each of said mold halves having a separately formed article bottom defining end portion, cooperating guide means between each of said mold halves and its respective end portion mounting said end portions for guided separation from its respective mold half, first means for effecting relative transverse movement between said first mold half end portion and said first mold half during separation of said mold halves to remove a blown article from said first mold half, and second means for thereafter effecting relative longitudinally movement between said second mold half end portion and said second mold half to separate said second mold half end portion from a blown article retained in said second mold half.

2. A mold according to claim 1 wherein said guide means between said first mold half and said first mold half end portion are operative to effect relative longitudinal movement between said first mold half and said first mold half end portion simultaneous with said relative transverse movement to separate said first mold half end portion from a blown article.

3. A mold according to claim 2 wherein said first means are in the form of latch means retaining said first and second mold half end portions in closed relation during separating relative movement of said first mold half end portion.

4. A mold according to claim 3 wherein there is a sliding connection between said latch means and said first mold half end portion facilitating relative longitudinal movement between said mold half end portions.

5. A mold according to claim 4 wherein the connection between said latch means and said first mold half end portion includes means for automatically releasing said first mold half end portion after a predetermined movement thereof wherein said first mold half end portion is disengaged from a blown article, and automatic return means connected to said first mold half end portion for returning the same into cooperating relation with said first mold half.

6. A mold according to claim 5 wherein said predetermined movement is in a longitudinal direction.

7. A mold according to claim 1 wherein said first means are in the form of latch means retaining said first and second mold half end portions in closed relation during separating relative movement of said first mold half end portion.

8. A mold according to claim 7 wherein there is a sliding connection between said latch means and said first mold half end portion facilitating relative longitudinal movement between said mold half end portions.

9. A mold according to claim 8 wherein the connection between said latch means and said first mold half end portion includes means for automatically releasing said first mold half end portion after a predetermined movement thereof wherein said first mold half end portion is disengaged from a blown article, and automatic return means connected to said first mold half end portion for returning the same into cooperating relation with said first mold half.

10. A mold according to claim 1 wherein said mold half end portions define a flash pocket, and said relative longitudinal movement between said second mold half and said second mold half end portion is operative to automatically separate flash from a respective blown article.

11. A mold according to claim 10 wherein said mold is one of a continuous series of like molds, and the flash receivable in said flash pocket constituting a major portion of the flash between adjacent articles molded in said molds.

12. A mold according to claim 10 wherein said mold is one of a continuous series of like molds adjacent ones of said molds being in contiguous relation with the flash between adjacent articles molded in said molds being of minimum length, and substantially all of the flash between adjacent articles being receivable in said flash pocket.

13. The mold of claim 12 wherein said mold includes a blow needle, said blow needle being carried by one of said mold half end portions for injection into flash positioned therein.

14. A mold according to claim 10 wherein said mold in one of a continuous series of like molds adjacent ones of said molds being in contiguous relation with the flash between adjacent articles molded in said molds being of minimum length, and said first mold half end portion being in supported engagement with an end of a next adjacent first mold.

15. The mold of claim 1 wherein said second means includes a crank assembly operable to translate rotary movement into straight line movement.

16. The mold of claim 1 wherein said second means includes a crank assembly operable to translate rotary movement into straight line movement and include a cam actuated lever.

17. A mold in accordance with claim 1 wherein there are a plurality of said molds all disposed in substantially touching end-to-end relation, and a support mounting said molds for rotation in unison.

18. A mold in accordance with claim 1 together with separate ejector means carried by said second mold half and said second mold half end portion for separately ejecting flash and blown articles.

19. A molding machine comprising a support, means mounting said support for rotation about a fixed axis, a plurality of molds mounted on said support for rotation in unison and for independent opening and closing movement, said molds being disposed in end-to-end substantially touching relation, each mold including first and second mold halves having a parting plane extending longitudinally of an article cavity defined therein, means mounting said mold halves for transverse separation, each of said mold halves having a separately formed article bottom defining end portion, cooperating guide means between each of said mold halves and its respective end portion mounting said end portions for guided separation from its respective mold half, first means for effecting relative transverse movement between said first mold half end portion and said first mold half during separation of said mold halves to remove a blown article from said first mold half, and second means for thereafter effecting relative longitudinally movement between said second mold half end portion and said second mold half to separate said second mold half end portion from a blown article retained in said second mold half.

* * * * *